US010355301B2

(12) United States Patent
De Vos et al.

(10) Patent No.: US 10,355,301 B2
(45) Date of Patent: Jul. 16, 2019

(54) APPARATUS COMPRISING A FUEL CELL UNIT AND A COMPONENT, AND A STACK COMPONENT FOR USE IN SUCH AN APPARATUS

(71) Applicant: BOSAL EMISSION CONTROL SYSTEMS NV, Lummen (BE)

(72) Inventors: Yves De Vos, Zemst (BE); Jean-Paul Hubert Janssens, Leopoldsburg (BE)

(73) Assignee: Bosal Emission Control Systems NV, Lummen (BE)

( * ) Notice: Subject to any disclaimer, the term of this patent is extended or adjusted under 35 U.S.C. 154(b) by 0 days.

(21) Appl. No.: 15/726,442

(22) Filed: Oct. 6, 2017

(65) Prior Publication Data
US 2018/0034092 A1 Feb. 1, 2018

Related U.S. Application Data

(63) Continuation of application No. 14/527,024, filed on Oct. 29, 2014, now Pat. No. 9,819,044.

(30) Foreign Application Priority Data

Nov. 4, 2013 (EP) .................................... 13191429

(51) Int. Cl.
*H01M 8/2485* (2016.01)
*H01M 8/2484* (2016.01)
(Continued)

(52) U.S. Cl.
CPC ..... *H01M 8/2484* (2016.02); *H01M 8/04074* (2013.01); *H01M 8/0625* (2013.01);
(Continued)

(58) Field of Classification Search
CPC ............. H01M 8/2485; H01M 8/0625; H01M 8/04074
See application file for complete search history.

(56) References Cited

U.S. PATENT DOCUMENTS 5,270,127 A * 12/1993 Koga ..................... B01J 8/0207
429/420
5,725,964 A 3/1998 Huppmann
(Continued)

FOREIGN PATENT DOCUMENTS

DE 19707648 A1 8/1998
JP H02126566 A 5/1990
(Continued)

*Primary Examiner* — Jeremiah R Smith
(74) *Attorney, Agent, or Firm* — Merchant & Gould P.C.

(57) ABSTRACT

A fuel cell unit with a plurality of fuel cells defining a longitudinal axis and a main flow direction coaxial to the longitudinal axis. Fuel cell inlets and fuel cell outlets are arranged at opposite ends of the fuel cell unit and in line with the main flow direction. Also, a component comprising first fluid conduits arranged parallel to the main flow direction, the first fluid conduits comprising first fluid inlets and first fluid outlets arranged at opposite ends of the component and in line with the main flow direction. The component is arranged adjacent the fuel cell unit such that at least one of the first fluid inlets and the first fluid outlets of the component are arranged adjacent at least one of the fuel cell outlets and the fuel cell inlets such that a fluid flow may flow substantially parallel to the longitudinal axis of the apparatus in the first fluid conduits of the component and in the fuel cell unit and when passing from the component to the fuel cell unit or vice versa.

18 Claims, 3 Drawing Sheets

(51) Int. Cl.
*H01M 8/0612* (2016.01)
*H01M 8/04007* (2016.01)
*H01M 8/247* (2016.01)
H01M 8/04082 (2016.01)
H01M 8/0662 (2016.01)
H01M 8/12 (2016.01)
H01M 8/2425 (2016.01)
F28D 21/00 (2006.01)

(52) U.S. Cl.
CPC ......... *H01M 8/247* (2013.01); *H01M 8/2485* (2013.01); *F28D 2021/0043* (2013.01); *H01M 8/04201* (2013.01); *H01M 8/0662* (2013.01); *H01M 8/12* (2013.01); *H01M 8/2425* (2013.01)

(56) References Cited

U.S. PATENT DOCUMENTS

| | | | |
|---|---|---|---|
| 5,874,183 | A | 2/1999 | Uematsu |
| 9,819,044 | B2 * | 11/2017 | De Vos ............... H01M 8/0625 |
| 2001/0046619 | A1 | 11/2001 | Allen |
| 2004/0043267 | A1 | 3/2004 | Schuler et al. |
| 2004/0081874 | A1 | 4/2004 | Tachtler et al. |
| 2008/0020247 | A1 | 1/2008 | Valensa et al. |

FOREIGN PATENT DOCUMENTS

| | | | |
|---|---|---|---|
| WO | 0237047 | A1 | 5/2002 |
| WO | 02091509 | A2 | 11/2002 |
| WO | 2004082057 | A1 | 9/2004 |
| WO | 2006102736 | A1 | 10/2006 |

* cited by examiner

APPARATUS COMPRISING A FUEL CELL UNIT AND A COMPONENT, AND A STACK COMPONENT FOR USE IN SUCH AN APPARATUS

This application is a Continuation of U.S. patent application Ser. No. 14/527,024, filed 29 Oct. 2014, now U.S. Pat. No. 9,819,044, which claims benefit of Serial No. 13191429.3, filed 4 Nov. 2013 in Europe and which applications are incorporated herein by reference. To the extent appropriate, a claim of priority is made to the above disclosed applications.

BACKGROUND

The application relates to an apparatus comprising a fuel cell unit and a component, such as for example a heat exchanger or a reformer. The application also relates to a stack component for use for example in such an apparatus or generally for use in combination with devices requiring a fluid flow passing through the device. The application also relates to a component unit comprising two stack components.

In order to optimize energy performance of fuel cell stacks, these are combined with heat exchangers, afterburners, reformers or several of these components. Since space is often limited compact systems are preferred. In WO-A-2004/082057 a modularly built fuel cell system is described, wherein further components such as an afterburner, a heat exchanger and a reformer are subsequently arranged to a planar fuel cell stack. The outer geometry of the fuel cell stack and the further components match each other. Through bore holes in the plates and tubes arranged in the components, fluid is guided within the components and from one component to another. Plates are positioned perpendicular to the general flow direction, so that the flow has to be guided by tubes from one component to another. Deflection plates may be required to bridge individual fluid channels in the system. Thus, this system bears high pressure drop and non-uniform temperatures due to fluid flow deflection and requires additional space to accommodate the connecting elements between components.

Therefore, there is a need for a compact apparatus comprising a fuel cell unit and a component such as for example a heat exchanger, a reformer, a preheater or an afterburner, which apparatus provides good flow characteristic. There is also a need to provide a component unit comprising two stack components to form for example such an apparatus or a stack component for use for example in such an apparatus, to support the overall performance of such a combined system.

SUMMARY

According to an aspect of the invention there is provided an apparatus comprising a fuel cell unit with a plurality of fuel cells arranged in parallel defining a longitudinal axis of the apparatus and defining a main flow direction coaxial to the longitudinal axis of the apparatus. Therein fuel cell inlets and fuel cell outlets are arranged at opposite ends of the fuel cell unit and in line with the main flow direction. The apparatus further comprises a component comprising first fluid conduits arranged parallel to the main flow direction. The first fluid conduits comprise first fluid inlets and first fluid outlets arranged at opposite ends of the component and in line with the main flow direction. The component is arranged adjacent the fuel cell unit such that at least one of the first fluid inlets and the first fluid outlets of the component are arranged adjacent at least one of the fuel cell outlets and the fuel cell inlets such that a fluid flow entering the apparatus may flow substantially parallel to the longitudinal axis of the apparatus in the first fluid conduits of the component and in the fuel cell unit and when passing from the component to the fuel cell unit or vice versa.

The fuel cell unit and the component, preferably a heat exchanger or a reformer, are arranged such that a fluid may flow essentially linearly and along the main flow direction through the component and through the fuel cell unit thus forming a main fluid flow through the apparatus according to the invention. The adjacent arrangement of fuel cell unit and component and of the fuel cell inlets and the first fluid outlets of the component or the fuel cell outlets and the first fluid inlets of the component, respectively, allow for an unhindered or undeflected passing of the fluid from the component to the fuel cell unit or vice versa (depending on the arrangement of component and fuel cell unit upstream or downstream of each other along the main flow direction). No reversing or change of direction, by for example 90 degrees, of a flow direction between or within parts of the apparatus takes place in the apparatus according to the invention. This may provide an overall low pressure drop in the apparatus, uniform flow velocity and uniform temperature distribution, as well as a compact design due to fewer components needed. In addition, flow uniformity may be realized in the apparatus and in individual parts of the apparatus. Interfaces or tube connections between parts of the apparatus or within a component become obsolete facilitating the realization of a compact apparatus. Enhanced energy efficiency may also be achieved due to improved temperature distribution in the apparatus. A component or fuel cell unit may be realized as module and combined to the apparatus according to the invention, which may facilitate the manufacture, installation and maintenance of the apparatus according to the invention. For example, a replacement of a component or of the fuel cell unit is facilitated. Also, a component may be adapted more easily to a specific fuel cell unit design.

If the component is a plate stack comprising a plurality of plates arranged in parallel above each other, then the plates of the component are arranged parallel to the main flow direction. If the fuel cell unit is a planar fuel cell unit comprising a plurality of plates arranged in parallel and above each other, then all plates of the apparatus may be arranged parallel to the main flow direction and especially also parallel to each other. However, the plates of the component or of the planar fuel cell unit may be rotated around a rotational axis corresponding to the longitudinal axis of the apparatus or to the main flow direction, respectively. Such a rotation of component, fuel cell unit, further component or of several parts of the apparatus against each other, may for example be in the range of between 0 degree and 180 degree, preferably 90 degree. Also in these embodiments, the plates of all parts of the apparatus are arranged parallel to the main flow direction. However, the plates of for example neighbouring stacks may be arranged for example perpendicular to each other.

In some preferred embodiments, the fuel cell unit is a unit of high temperature fuel cells such as for example solid oxide fuel cells (SOFCs). Especially, in high temperature fuel cells fluids at high temperatures may be further used and only part of the fuel for the fuel cells is used up in the fuel cells itself. Therefore, further efficiency may be gained by optimizing the flow characteristics, especially when combining the fuel cells with a heat exchanger or with a reformer or preferably with both.

A main fluid flow flowing in the main fluid direction may for example be a cathode flow of the fuel cell and of the reformer and a hot gas flow through a heat exchanger. Preferably, the main fluid flow is the fluid flow with the higher volumetric flow rate through the fuel cell unit and through the components of the apparatus. Thus, the main fluid corresponds to the first fluid through the component, while a second fluid generally has a flow rate with a lower volumetric flow rate than the flow rate of the first fluid. The second fluid may also be the fluid flow with a lower mass flow rate than the first or main flow. However, a lower volumetric flow may also be achieved by a fluid flow with the same mass flow rate but with lower temperature than the fluid of the main flow (or first flow, respectively). By optimizing, especially uniformizing, a fluid flow with the higher volumetric flow rate significant efficiency of the apparatus may be gained. For example, a cathode flow of a reformer may be higher than an anode flow by about two orders of magnitude.

Also the flow of a second fluid in the second fluid conduits of the stack component may be optimized. The second fluid also flows parallel to the plates of the stack component.

A component may be arranged upstream or downstream of a fuel cell unit. Accordingly, it is the first fluid outlets of the component, which are arranged adjacent the fuel cell inlets (when the component is arranged upstream of the fuel cell unit) or it is the fuel cell outlets, which are arranged adjacent the first fluid inlets of the component (when the component is arranged downstream of the fuel cell unit).

If one or several further components are provided in the apparatus according to the invention, such as for example a heat exchanger, a reformer, an afterburner or a preheater, preferably also in further components conduits for a fluid are arranged such as to allow a first fluid to flow into the main flow direction. An apparatus may thus be extended by further components without losing its flow characteristic or its compactness.

Advantageously, the component, for example as used in the apparatus according to the invention, is a reformer or a heat exchanger, for example also in the version of an afterburner or a preheater. In some preferred embodiments of the apparatus according to the invention, the component is arranged on a, preferably upstream, side of the fuel cell unit and at least one further component is arranged on an, preferably downstream, opposite side of the fuel cell unit. For example, a heat exchanger may be arranged on an upstream side of the fuel cell unit such that a hot gas stream may flow parallel to the longitudinal axis of the apparatus and enter the fuel cells of the fuel cell unit as cathode flow. Upon leaving the fuel cell unit this cathode flow still flows along the main flow direction parallel the longitudinal axis of the apparatus into and through the reformer arranged downstream and adjacent the fuel cell unit.

In such an arrangement of the apparatus, a second fluid flow in the heat exchanger may for example be a mixture of an anode gas from the fuel cell unit and a hot gas. This mixture is then oxidized in the heat exchanger. The produced heat is used for (further) heating up the cathode gas, which is then led into the fuel cells of the fuel cell unit. Discharge outlets from the fuel cell unit may thus directly be connected to second fluid inlets of the adjacently arranged heat exchanger. Heat produced in the fuel cell unit may be used for the reforming action in the reformer arranged further downstream. If the heat exchanger is arranged downstream of the fuel cell unit, the second fluid may for example be a cool gas or cool liquid that is heated by the hot first fluid of the heat exchanger.

According to an aspect of the apparatus according to the invention, a height and a width of the fuel cell unit corresponds to a height and a width of the component. The geometrical matching of the parts of the apparatus according to the invention allows a very compact design of the apparatus and enhanced flow and temperature characteristic. An adjacent arrangement of the individual parts require no further adaptors and may easily be supplemented with further matching components. While the fuel cell unit may be a planar stack of fuel cells or also a stack of tubular fuel cells, the components, especially heat exchangers and reformers preferably are plate stacks. In these plate stacks the width of the plates of a component corresponds to the width of the fuel cell unit. The heights of the stacks match each other in height, accordingly, that is, component and fuel cell unit have a same height. A length of the stacks may be adapted to the required physical or chemical process to be performed in the component or to specifications of the adjacent fuel cell unit or components. For example, a geometrical matching of the or of further components and the fuel cell unit include adjustment of the number of plates in a component stack, so that the height of the stack is the same as the height of the next component, for example a fuel cell stack. By this, the width and height of the outlet of for example a heat exchanger may be identical to the width and height of the fuel cell stack.

By a geometrical matching of the component and the fuel cell unit, a matching of the 'core element' or 'core stack' is meant, that is, that portion of the component is referred to, where the physical or chemical process of the component is performed. The component typically comprises second inlets and second outlets for a second fluid, such as for example a cool or hot fluid for a heat exchanger or an anode fluid for the reformer. These supply inlets and discharge outlets do not form part of the core stack but may extend for example to two opposing sides of the apparatus. Also the fuel cell unit may be provided with supply inlets, for example with one tubular inlet or a set of small tubes, each connected to a segment of the fuel cell unit.

First fluid inlets and outlets as well as fuel cell inlets and outlets arranged in-line with the main flow direction, may be mechanically attached to each other. Preferably, inlets and outlets of adjacent parts of the apparatus are not mechanically attached to each other. The component and the fuel cell unit are arranged adjacent each other preferably such that it is excluded that the main fluid flow (or first fluid) is mixed with another fluid, for example a second fluid of a component. The adjacent arrangement is also performed to support a substantially linear flow along the main flow direction in the apparatus and such that the main flow direction is substantially parallel to the longitudinal direction of the apparatus. The main flow being substantially parallel to the longitudinal axis may also include small deviations from the parallel direction, for example due to different inlet or outlet forms and sizes of adjacent parts of the apparatus.

In preferred embodiments of the apparatus according to the invention, the component comprises a plurality of plates arranged parallel to and above each other forming a stack component. Through the special guiding of the main fluid flow according to the invention and preferably also of further flows, described herein, an entire surface of the plates is useable for guiding a fluid flow along the plates. Spacers may be arranged along edges of plates and between individual plates to separate the plates. By this, a single continuous conduit is created between the plates for a fluid to be guided between the plates. The spacers may directly serve for closing the sides between plates. A conduit may for example also be formed by accordingly formed plates (profiled plates), for example through die forming or stamping. In these cases, the edges may directly be sealed by welding or brazing. Next to spacers or other closing means for closing sides of plates, no openings or tubes for a flow passage through the plates or perpendicular to the plates are present or required. Thus, the entire surface of a plate in the component is available for guiding a fluid along the plate. By this, for example, also the entire surface is available for a physical or chemical process, for example a heat exchange or reforming process. In addition, side zones of plates may for example be used for optimizing a flow direction while still a large central zone of the plates is available for a heat exchanging or other process the component is intended to be used for. Also no redirecting of a flow from one plate to a perpendicularly arranged inlet or outlet tube takes place in the apparatus according to the invention. Also no dividing elements are present within a first or second conduit, which would separate the conduits into individual small channels which might lead to significant pressure drop and non-uniform heat exchange. Thus, a flow, as well as pressure and temperature in the flow is more uniform.

According to an aspect of the apparatus according to the invention, a gap is arranged between the fuel cell unit and the component. By the gap, no mechanical connection inside and between the fuel cell unit and the component is required or available (except for an outer housing). This facilitates installation, manufacture and maintenance of the apparatus according to the invention. Also more flexibility in the kind of apparatus to be manufactured is available. For example, individual parts may be manufactured as modules and may be replaced individually. For example, also a fuel cell unit may be replaced by a different type of fuel cell unit. By the provision of a gap, no further interfaces or deflection plates are required. This not only reduces costs but also allows for an even more compact manufacture of the apparatus. In addition, uniformity of the main fluid flow is further supported and pressure loss due to the presence of mechanical elements may be prevented.

If several components are provided, preferably all components are arranged adjacent each other or adjacent the fuel cell unit, respectively, and a gap is provided between all the components and between the components and the fuel cell unit.

A gap may have a width for example in the range between 1 mm and 25 mm, for example between 2 mm and 15 mm, for example between 3 mm and 5 mm.

According to yet another aspect of the apparatus according to the invention, the apparatus further comprises a main inlet with an inlet distribution portion, wherein a depth of the inlet distribution portion preferably varies, preferably along the height of the component. The inlet distribution portion is arranged adjacent the fuel cell unit or adjacent the component, depending on which part of the apparatus is arranged most upstream. A main fluid may be introduced through a main inlet opening into the main inlet. The main fluid is then distributed inside the inlet distribution portion over preferably an entire side of the apparatus, preferably over the entire height and width of the fuel cell unit or of the core stack of a component, respectively. By varying the depth of the inlet distribution portion of the main inlet, an extension of the inlet distribution portion in the longitudinal direction of the apparatus is varied. Advantageously, an end region of the inlet distribution portion versus a main inlet opening, for example versus the top of the apparatus, is wider than an end region of the inlet distribution portion opposite the main inlet opening, for example versus the bottom of the apparatus. By this, the main fluid may enter an entire side of the fuel cell or component, respectively. By varying the depth of the inlet distribution portion the main flow may be uniformly distributed over an entire stack, despite the fact that a fluid inlet is arranged at a centralized location only. This further supports the performance of the apparatus according to the invention.

The apparatus according to the invention may further be provided with a main outlet comprising an outlet collection portion. The outlet collection portion may be constructed similar to the main distribution portion, while for example a depth may be different than the depth of the inlet distribution portion. The main outlet is arranged adjacent the most downstream part of the apparatus, for example adjacent a further component. Preferably, a small gap of a few millimeters is provided between the main inlet and the part of the apparatus arranged adjacent the main inlet, as well as between the main outlet and the part of the apparatus arranged adjacent the main outlet.

According to another aspect of the apparatus according to the invention, the component further comprises second conduits with a second fluid inlet and a second fluid outlet. The second conduits are adapted for a second fluid to pass through the component. Since most components used in the apparatus according to the invention require a second flow, such as a heat exchanger (hot and cool flow) or a reformer (hot and fuel containing flow), an optimization of a second flow in the component, especially an optimization with respect to the first flow flowing in the main flow direction may further support the overall performance of the apparatus according to the invention. Overall performance may be achieved without exchanging mass flow between individual fluids.

Preferably, the second fluid inlet and second fluid outlet are arranged along the height of the component or of a stack, respectively, and are arranged at opposite sides of the stack. By this, a supply of second fluid may be provided at one side of the component only (for example a top side), and is distributed over the entire height of the component in the second inlet. Then the second fluid flow enters the second conduits, passes the second conduits, which preferably also extend over the entire surface of the plates, and leaves the component by the second fluid outlet. For further optimizing a flow in the component, the second fluid inlet may be arranged in an upstream region of a side of the component and the second fluid outlet may be arranged at a downstream region of an opposite side of the component. By this, the second fluid may enter the component from a side of the component but then be made to flow essentially parallel to the main flow direction in a central zone of the component and leave the component at the opposite side. Such a co-flow arrangement in a central zone may be preferred in, for example, a heat exchanger or also a reformer. However, for a counter-flow arrangement, the second fluid inlet may also be arranged at a downstream region of a side of the component and the second fluid outlet may be arranged at an upstream region of the opposite side of the component.

In a compact arrangement, a width of the apparatus and of the component accordingly, may be larger than the length of the component, that is, than the extension of the component in the longitudinal direction of the apparatus. Thus, the second fluid flow has to be distributed over the entire width of the component, preferably evenly. This is preferably done such that a central zone of the second conduits of the plates, respectively, preferably covers a large section of a cross section of the component and preferably such that a homogeneous flow with a low velocity is achieved within this central zone. By this, any process to be performed in the component may be supported.

According to a further aspect of the apparatus according to the invention, the component further comprises obstructions means in the second conduits. Advantageously, obstruction means are provided for causing a locally variable pressure drop or locally varying fluid velocity of the second fluid in the second conduits of the component. By locally varying the flow characteristic, a distributing, guiding, collecting, heat exchange, chemical reaction or a combination thereof of the second fluid flow in the second conduits may be supported and altered. Fluid characteristic may also be adapted according to the geometry of the component or to other requirements of the apparatus according to the invention by appropriate selection of obstruction means. For example, a distribution of the second fluid over the width of the component and a collection of the second flow to be directed to the second fluid outlet may be supported. Advantageously, different obstruction means are arranged in inlet distribution zone, in central zone and in outlet collection zone of the second conduits. Preferably, the different obstruction means are such that a pressure drop of the second fluid caused by the obstruction means in the central zone is higher than the pressure drop caused in the inlet distribution zone and in the outlet collection zone. Such a different pressure drop may for example also be achieved by providing obstructions in the central zone but not in the inlet distribution zone and in the outlet collection zone. In order to support a distribution in the inlet distribution zone and a collection in the outlet collection zone, obstruction means may also vary inside a zone. For example, obstruction means may be provided such that close to an inlet or outlet only low pressure drop is caused, while close to a respective opposite side of the inlet or outlet and in the central zone high pressure drop is caused. Preferably, obstruction means are adapted to a flow direction.

Preferably, obstruction means are structures provided in conduit walls such as structures in a plate surface forming the conduit wall. Structures may be profiles in plates with a periodic set of ridges and valleys. Ridges and valleys may for example have a smaller period in the central zone of the plates, or have a different profile that represents a lower hydraulic diameter. This may also facilitate a heat exchange in the central area of the component.

Structures may also for example be realized by a rough surface, for example a coating of a conduit wall. A coating may also cover only part of the central zone or of another zone of the plate. A coating may for example be a catalytic coating, for example in at least part of the central zone of a heat exchanger or a reformer. By this, catalytic reactions may be limited to a specific zone of the component. This zone may be chosen so that the reactions only take place in an area where for example the flow is uniform, where a temperature profile is best suited for the reactions to occur or for example for reaction heat to be exchanged with the other (main) flow in an efficient manner.

In addition, a thickness of a coating may reduce the remaining thickness of the flow conduit, so that pressure drop increases in the coated section. This further facilitates the uniformity of the flow in this section.

If obstruction means are realized in the form of a plate profile, these are designed such as to preferably not influence a flow distribution in the main flow path. However, since the main flow is large and already has a large pressure drop, it may be desirable to reduce the pressure drop in the main flow conduit. This may for example be done by reducing the open space between ridges of plates. The open space between these ridges and valleys will then be larger at the other side of the plates, that is, the side of the main flow. By this, the pressure drop in the path of the main flow may be reduced, while the pressure drop of the second flow is increased.

According to a further aspect of the apparatus according to the invention, a main inlet opening and a main outlet opening is arranged at opposite ends of the apparatus and such to enable a main fluid supply and a main fluid discharge from a same side of the apparatus. By this, a fluid supply to and a discharge from the apparatus is facilitated. Preferably, fluid is supplied and discharged from a top side of the apparatus. Preferably, all inlets and outlets of parts of the apparatus are arranged such that all fluid supplies and all fluid discharges may be arranged on a same side, preferably a top side, of the apparatus. By this, an apparatus may for example be inserted into a compartment which size matches the size of the apparatus. For example, second fluid inlets and outlets may be arranged such, for example at the sides of the apparatus, so that they are adjacent to the supply inlets and discharge outlets of the fuel cell stacks, where they may be connected to. Installation and maintenance may then be performed from above the apparatus without need of access to lower parts of the apparatus.

It is advantageous to have no inlets and outlets at the bottom of the apparatus. By this, the apparatus may be mounted on a flat surface, for example a flat insulation material or a steel plate, for example bearing the weight of the complete apparatus.

According to another aspect of the invention, there is provided a component unit comprising a first stack component and comprising a second stack component. The component may, for example, be combined with a fuel cell unit for forming an apparatus as described herein. Each of the first stack component and the second stack component comprise a plurality of plates arranged parallel to a main flow direction and at a distance to each other forming a stack. The stacks are open at a front side and at a back side for a first fluid to enter the stack at the front side, to pass through the stack along the main flow direction and to leave the stack at the back side. Each of the first and the second stack further comprise second fluid conduits with a second fluid inlet and a second fluid outlet. The second fluid inlet is arranged at a lateral side of the stacks and the second fluid outlet is arranged at an opposite lateral side of the stacks. In the component unit, the first stack component and the second stack component are arranged at a predefined distance to each other. The open back side of the first stack component is arranged parallel to the open front side of the second stack component at the predefined distance. In preferred embodiments, the component unit further comprises a stabilizing frame. The frame is designed for stabilizing the first stack component and the second stack component at the predefined distance and position relative to each other during handling and operation of the component, especially during operation at different temperatures. The stabilizing frame may prevent that the components shift, for example horizontally or vertically, or rotate relative to each other. Such a shift or rotation may for example be caused by thermal expansion or creep. A displacement against each other can deflect or obstruct the flow as it passes through the apparatus substantially parallel to the longitudinal axis of the component unit or apparatus, respectively. A stabilizing may support or guarantee the optimal working of the components, especially at different temperatures and pressures, for example during start-up, continuous operation and cool down. These events can cause rapid or non-uniform heating of parts of the component and may cause deformations due to the thermal expansion or due to creep. Yet further, the frame may fix the size of a cavity in between the two components, especially also at different temperatures and pressures such as may be present during start-up, continuous operation and cool down. The stabilizing frame may thus provide the component unit for a defined application, for example a combination with a specific fuel cell unit.

According to yet another aspect of the invention there is provided a stack component for example for use in a component unit or in an apparatus according to the invention and as described herein. The stack component comprises a plurality of plates arranged parallel to a main flow direction and at a distance to each other forming a stack. The stack is open at a front side and at a back side for a first fluid to enter the stack at the front side, to pass through the stack along the main flow direction and to leave the stack at the back side. The stack component further comprises second fluid conduits with a second fluid inlet and a second fluid outlet. The second fluid inlet is arranged at a lateral side of the stack and the second fluid outlet is arranged at an opposite lateral side of the stack. At least one of the plates of the plurality of plates forming the second fluid conduits comprises a central zone arranged next to an inlet distribution zone and next to an outlet collection zone, wherein the central zone comprises obstruction means.

Preferably, second fluid inlet and second fluid outlet as well as the obstruction means in the central zone of the at least one plate are arranged such that a second fluid entering the stack component via second fluid inlet is caused to flow substantially in the main flow direction in the central zone of the at least one plate.

Advantageously, at least one of two plates forming a second fluid conduit in between the two plates is provided with a central zone comprising obstructions means.

According to an aspect of the stack component according to the invention, at least two of the inlet distribution zone, outlet collection zone and central zone comprise different obstruction means.

According to another aspect of the stack component according to the invention, at least one of the inlet distribution zone and the outlet collection zone comprises a variable extension along the main flow direction. Preferably, the extension along the main flow direction of the inlet distribution zone or of the outlet collection zone or of both varies linearly along the front side. Preferably, the size of the inlet distribution zone diminishes with distance from the second fluid inlet. Preferably, the size of the outlet collection zone diminishes with distance from the second fluid outlet. Preferably, inlet distribution zone or outlet collection zone or both are wedge-shaped.

Inlet distribution zone and outlet collection zone may be symmetric with respect to form, size and obstruction means. An entire plate may be point symmetric with respect to the center of the plate.

Preferably, an inlet distribution zone extends substantially over the entire front side of the at least one plate, and the outlet collection zone extends substantially over the entire back side of the at least one plate. If the inlet distribution zone and the outlet collection zone is wedge-shaped, the central zone has the form substantially of a parallelepiped upon use of rectangular plates. If obstruction means, such as for example surface structures, are provided in the inlet distribution zone or the outlet collection zone or in both, such surface structures are preferably more expressed (more dense, higher etc.) in parts of the inlet distribution zone remote from the second fluid inlet and in parts of the outlet collection zone remote from the second fluid outlet than in parts next to inlet or outlet.

According to some preferred embodiments of the stack component according to the invention, the stack component further comprises at least one of a main inlet portion arranged adjacent the front side of the stack component or a main outlet portion arranged adjacent the back side of the stack component. The main inlet portion is provided for distributing a main fluid flow over an entire height of and into the stack component, while a main outlet portion is provided for collecting a main fluid from the entire height of the stack component and guiding the main fluid to a main outlet opening. The main outlet portion and the main inlet portion may have a varying depth, preferably varying along the height of the component. Preferably, the main inlet portion or the main outlet portion or both are wedge-shaped.

Preferably, a stack component is a heat exchanger, for example also in the form of an afterburner, or preheater or reformer to be combined with a fuel cell unit or with a catalytic converter or similar. However, the stack component may also be designed such as to comprise not only an individual component but also a fuel cell unit or a further component.

Thus, according to an aspect of the stack component according to the invention, the plurality of plates further comprise sections with chemically active surfaces, preferably catalytically active surfaces, adapted for use in a fuel cell unit. A first part of the stack component, for example an upstream part, comprises the second fluid conduits and is adapted to form a heat exchanger stack or a reformer stack. A second, for example downstream or further downstream, part of the stack component comprises the sections such that the second part of the stack component is adapted for use as a fuel cell unit.

In such a stack component, the plates have a length, which extends not only over the length of for example a heat exchanger or of a reformer but also extends further over the length of a fuel cell unit. Accordingly, parts of the plates comprise physical and chemical properties of the function to be performed by that part of the plate stack. For example, if an upstream component shall be a heat exchanger or a reformer, the upstream first part of the plates comprise obstruction means for second fluid conduits and possibly portions with a catalytically active surface for a reforming or other chemical reaction. The plurality of plates arranged above each other comprising the second fluid conduits then forms the heat exchanger or reformer (or heat exchanger or reformer part of the stack component). A further downstream second part of the plates is coated by corresponding chemically active substances in order for that part of the plates to form bipolar plates for use as electrodes in a fuel cell. That second part of the plate stack component comprising the further downstream second parts of the plates then forms a planar fuel cell unit.

By such a construction of component and fuel cell unit, a geometrical matching of height and width of a stack component or an apparatus is automatically given. Also a main fluid flow direction is along the plurality of plates with no gap between a component and a fuel cell unit. Thus, further flow uniformity, temperature uniformity, a compact arrangement with fewer single components may be achieved.

If the parts of the apparatus according to the invention as described above are plate stacks, the individual plate stacks may be modules to be arranged next to each other to form an apparatus according to the invention. However, the plates of the individual parts may be made of one plurality of plates only, which plurality of plates extends over a component and over a fuel cell unit and possibly further components. The individual parts of the plates are prepared and adapted accordingly to perform their respective function of the parts of the apparatus.

Advantages and further aspects of the stack component according to the invention and the component unit comprising two stack components have been described referring to the apparatus above and will therefore not be repeated. In the stack component the front side corresponds to a long side of the apparatus and the extension along the front side corresponds to the width of the apparatus accordingly.

The stack component as well as the component unit is preferably used in combination with a high temperature fuel cell unit or incorporates a high temperature fuel cell to form an apparatus for example as disclosed herein. However, with the stack component according to the invention, further devices requiring at least one fluid flow may by optimized. By a combination of such a device with a stack component according to the invention and as described herein relating to a fuel cell unit, a main flow direction is defined and flow uniformity of the main fluid flow as well as of second fluid flows may be achieved. Such a further device may for example be a converter, such as a catalytic converter as used for example in exhaust systems of motor vehicles.

BRIEF DESCRIPTION OF THE DRAWINGS

The invention is further described with regard to embodiments, which are illustrated by means of the following drawings, wherein.

DETAILED DESCRIPTION

Figure 1:
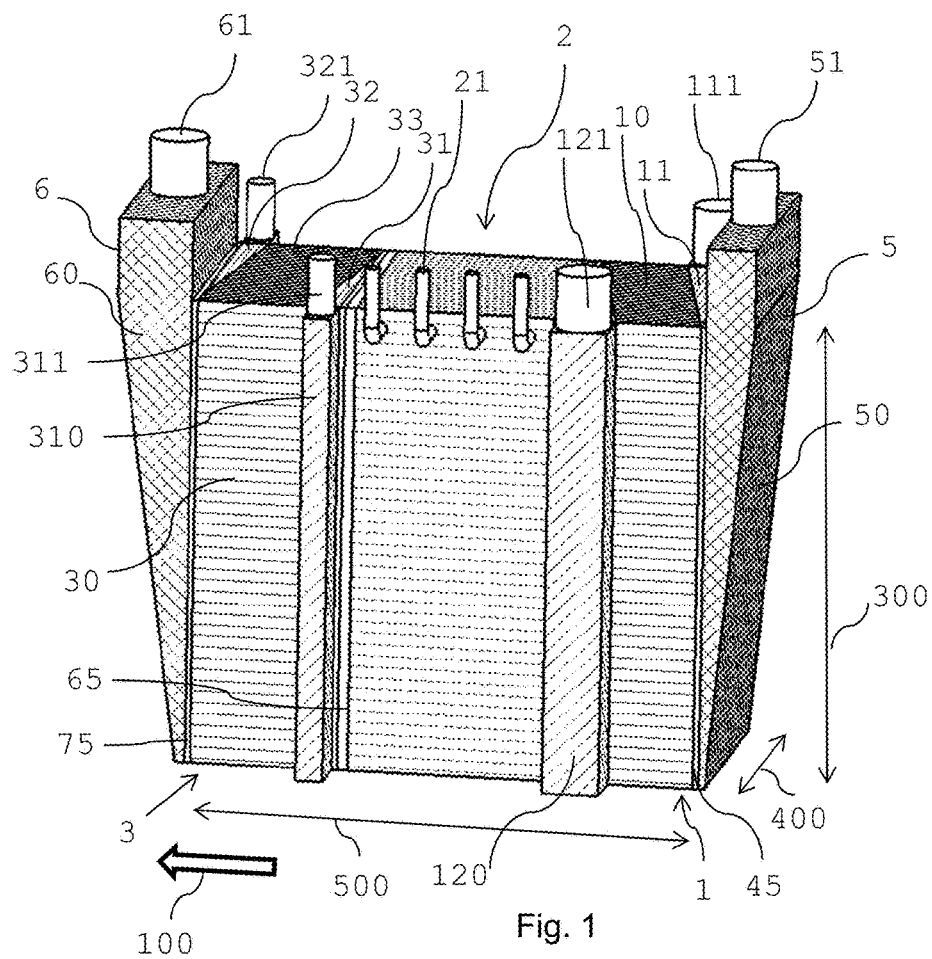
FIG. 1 shows a schematic view of an apparatus according to the invention.
Figure 2:
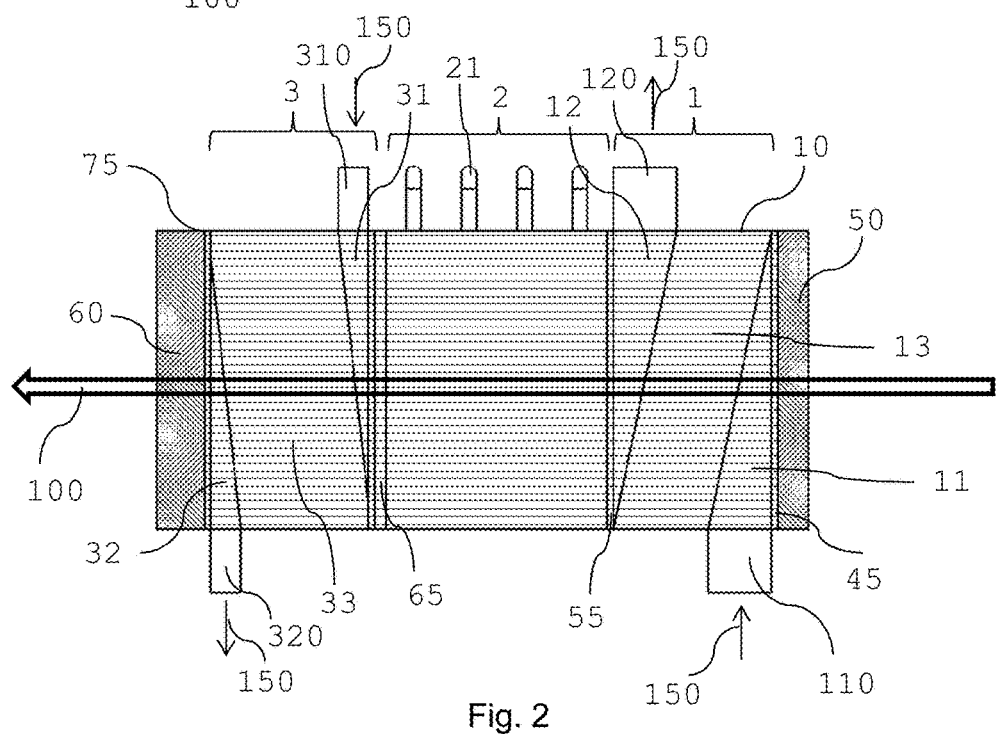
FIG. 2 is a cross section through the apparatus of FIG. 1.

FIG. 1 shows a compact rectangular apparatus with a fuel cell stack 2, for example a solid oxide fuel cell (SOFC) stack combined with a reformer 3 and heat exchanger 1. The heat exchanger 1 is arranged on an upstream side of the fuel cell stack 2 and the reformer 3 is arranged on the opposite downstream side of the fuel cell stack 2. Reformer 3 and heat exchanger 1 are a multiple plate reformer and a multiple plate heat exchanger, wherein the individual plates are arranged parallel and at a distance to each other in a bottom top arrangement in the embodiment as shown. The fuel cell stack 2 may be a parallel arrangement of individual plate fuel cells or tubular fuel cells, with the tube axis or plates arranged parallel to the length 500 or longitudinal axis of the apparatus. The outer dimensions of the heat exchanger 1, fuel cell stack 2 and reformer 2 correspond to each other, especially a stack height 300 of all three parts 1,2,3 is identical and a plate width 400 of heat exchanger 1 and reformer 3 is identical and corresponds to the stack width 400 of the fuel cells. The longitudinal ends of the apparatus are provided with a main inlet 5 and a main outlet 6. By these, a main fluid is directed into the apparatus and guided along a main fluid direction 100, through the heat exchanger 1, the fuel cell 2 and subsequently through the reformer 3, before the main fluid is guided out of the apparatus through main outlet 6. The main flow direction 100 through the parts 1,2,3 of the apparatus is also indicated in FIG. 2, which is a view onto a longitudinal cross section of the apparatus shown in FIG. 1.

The main inlet 5 is provided with an inlet opening 51 and a wedge-shaped inlet distribution portion 50. The wedge-shaped inlet distribution portion 50 is arranged adjacent the heat exchanger plate stack 1. Inlet opening 51 and outlet opening 61 are arranged at the top of the apparatus. Inlet distribution portion 50 is broadest at the top of the stack and smallest at the bottom of the stack (with reference to the longitudinal direction of the apparatus). The main outlet 6 is provided with an outlet opening 61 and a wedge-shaped outlet collection portion 60. The wedge-shaped outlet collection portion 60 is arranged adjacent the reformer stack 3 and is also broadest at the top of the stack and smallest at the bottom of the stack. The sizes of the wedge-shaped distribution portion 50 and collection portion 60 may be adapted to optimize a flow velocity, pressure drop, flow uniformity and flow distribution or collection, respectively, in the respective portions 50, 60. For example, in the embodiment shown, the size of the wedge of the collection portion 60 is larger in depth that the size of the wedge of the distribution portion 50.

The parts of the apparatus, heat exchanger 1, fuel cell 2 and reformer 3 are directly arranged adjacent each other, separated only by a small gap 55, 65. The gaps 55,65 are typically in the range of a few millimeters, for example between 2 and 10 mm. The gap size may be adapted to the size of the apparatus. No interfaces, tubes, adaptors, manifolds or additional pressure drop plates are provided between the individual parts of the apparatus. Also main inlet 5 and main outlet 6 are arranged adjacent the heat exchanger 1 and reformer 3, separated only by small gaps 45,75. The main fluid may be distributed to all the first conduits by the main inlet 5 without any openings or connecting conduits required in the plates of the stack. In addition, the main fluid may be collected from all the first conduits by the main outlet 6 without any openings or connecting conduits in the plates of the stack.

The main or first fluid flow of the heat exchanger 1 and of the reformer 3 is "inline" with the main fluid flow through the fuel cell stack 2 and this main flow is flowing in the main flow direction 100. The plates of the heat exchanger 1 and reformer 3 are arranged parallel to the main flow direction 100 to enable such a direct and undeflected flow. The fuel cells are arranged such that the main flow, typically a cathode flow, is arranged in a longitudinal direction of the fuel cell stack and of the apparatus. One, preferably, major flow of the heat exchanger 1, for example a hot gas flow, led into the apparatus through main inlet 5 flows from the wedge-shaped inlet distribution portion 50 along the entire height 300 into the heat exchanger 1 and through the heat exchanger in the longitudinal direction of the apparatus. Also the main flow through the reformer 3, preferably a cathode flow as well, flows in the same longitudinal direction through the entire reformer until the flow enters the wedge-shaped main outlet portion 60.

By a straight main fluid flow through the apparatus, low pressure drop, uniform temperature and pressure distribution in the apparatus may be achieved. In addition, a compact apparatus requiring less components at reduced costs may be realized.

To further optimize the performance of the fuel cell 2, and of the entire apparatus, also the second flows in the heat exchanger 1 and reformer 2 are optimized for example as shown in FIG. 1 and FIG. 2. The second, volumetrically smaller flows, indicated by arrows 150, are introduced from the side into the heat exchanger 1 and reformer 3, respectively, via second inlet channels 110,310. The second fluids are guided out of the heat exchanger 1 and reformer 3, respectively, via second outlet channels 120,320, also sideways but on an opposite lateral side of the components.

By this, second fluids may be provided to and discharged from the apparatus from the side of the stacks 1,3 and through respective second fluid inlet and outlet openings 111,311,121,321 arranged at the top of the stack. Also secondary supply inlets and outlets 21 for the fuel cells are arranged at the top side of the apparatus.

This facilitates an installation of the apparatus according to the invention since supply or discharge lines may be provided at and from the top of the apparatus. Especially, no inlets or outlets are arranged at the bottom of the apparatus.

The second fluid may be distributed to all the second conduits by the second inlet channels 110,310 without any openings or connecting conduits required in the plates of the stack. In addition, the second fluid may be collected from all the second conduits by the second outlet channels 120,320 without any openings or connecting conduits in the plates of the stack.

The respective second fluids are introduced into the components perpendicular to the main flow direction 100, are redirected such as to flow parallel to the main flow in a central zone 13,33 of the components 1, 3 and are redirected again to leave the components 1,3 perpendicular to the main flow direction 100.

The plates of the components of the apparatus comprise different zones, such as inlet distribution zones 11, 31, central zones 13,33 and outlet collection zones 12, 32 of heat exchanger 1 and reformer 3. Inlet and outlet zones directly follow the second fluid inlets 110,310 and second fluid outlets 120,320, respectively. The inlet and outlet zones 11,31 extend over the entire width 400 or substantially the entire width of the apparatus and have the shape of a triangle or the form of a wedge when seen an a three dimensional manner (intermediate conduits for the main fluid flows are omitted in FIG. 1). The central zones 13,33 have substantially the forms of a parallelepiped. Inlet, central and outlet zone generally differ by their influence on second flow behavior. Typically, structures influencing such a flow behavior are arranged in one, two or all three zones. Depending on the required pressure drop, flow direction or flow uniformity that shall be achieved in the respective zone, structures are provided and arranged accordingly. Preferably, structures causing high pressure drop are arranged in the central zones 13,33. Inlet zones 11,31 and outlet zones 12,32 may be provided with no or less structure than the central zones. Structures may especially be different in a zone itself.

Figure 3:
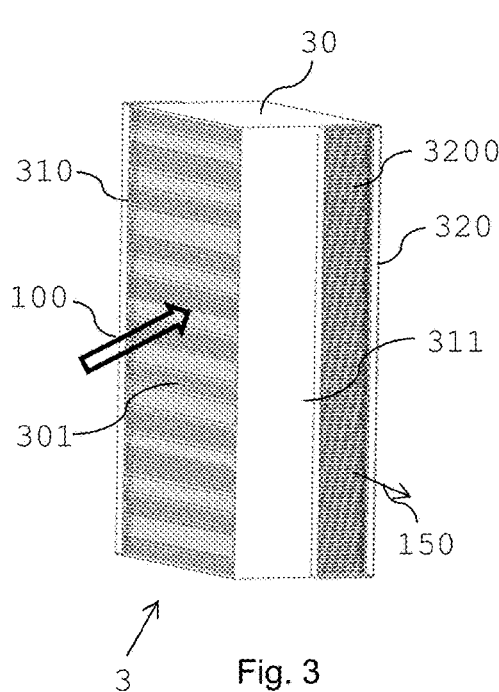
FIG. 3 is a perspective view of a reformer for use in an apparatus according to FIG. 1.

FIG. 3 shows a reformer 3 representing a stack component of the present invention with rectangular plates 301 arranged parallel to each other in a top to bottom arrangement forming a plate stack 30. The two lateral sides of the plate stack 30 are provided with side wall portions 311 closing part of the sides of the stack 30 to the environment. The side parts of the reformer not closed by the side wall portions 311 are open and form second fluid inlets and second fluid outlets 3200 accordingly. The second fluid may for example be a fuel containing anode flow.

The open front side allows the entry of a fluid flow between the plates 301 along the entire height of the reformer stack 30. The fluid flow passes through the reformer between the plates in the main flow direction 100 and leaves the reformer at the back side again along the entire height of the reformer. From there the main flow may either flow straight into a fuel cell stack or into a further component or into a main inlet collection portion as described with reference to FIG. 1.

Figure 4:
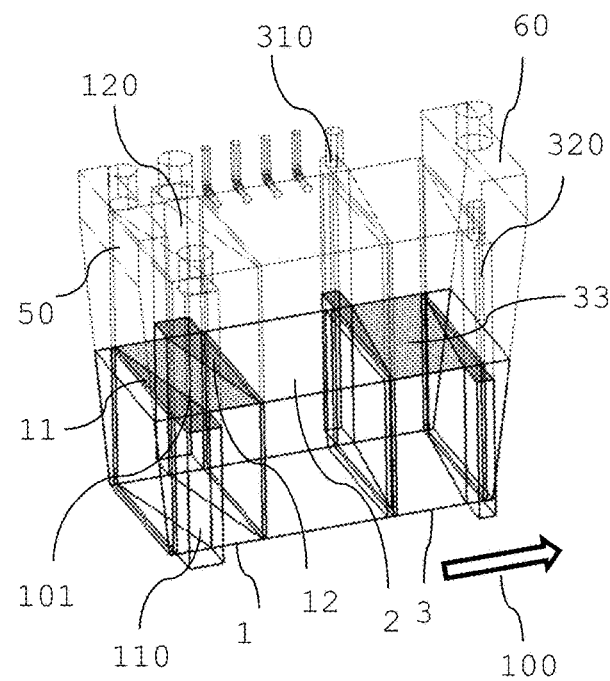
FIG. 4 is a schematic through-view of the apparatus of FIG. 1 with second fluid flow indicated for an intermediate heat exchanger and reformer section.

In FIG. 4 a through-view of an apparatus according to FIG. 1 is schematically shown. The zones of the plates are shown for an intermediate second conduit of a heat exchanger and reformer plate arrangement.

A second fluid at high velocity enters the heat exchanger 1 via second fluid inlet channel 110 through second fluid inlet into the second conduit. The second fluid is slowed down gradually in the wedge-shaped inlet distribution zone 11 of the heat exchanger 1. The fluid flow is redirected from the direction perpendicular to the longitudinal axis of the apparatus to flow essentially parallel to the longitudinal axis of the apparatus in the central zone 101 of the second conduit of the heat exchanger (corresponding to the main flow direction 100). It is mainly in the central zone 101, where the heat exchanging process takes place. In this central zone 101 the flow velocity is slow and substantially homogeneous over about the entire central zone 101. When the second fluid reaches the opposite end of the second conduit between two plates, the flow is redirected again to flow perpendicular to the main flow direction 100 and is led along the outlet collection zone 12 to second fluid outlet channel 120. In the outlet collection zone 12 the second fluid gains velocity such that the second fluid flow leaves the heat exchanger at a higher velocity again. Different flow velocities and different pressure drop zones in the heat exchanger may for example be achieved by appropriate surface structuring of the plates of the heat exchanger. This will be explained in more detail with reference to the reformer in FIG. 5. The structure of the second conduit for the second fluid flow of the reformer as well as of the guiding of the fluid flow in the reformer is basically the same as the one of the heat exchanger.

The second fluid in the heat exchanger may for example be a cool fluid such as a cool gas or a cool liquid, which is warmed up in the heat exchanger. The second fluid may for example also be a hot fluid with low mass flow or a combination of two fluids such as a mixture of hot fluid and an anode gas, which may be oxidized in the second conduit. For the latter application, the heat exchanger is preferably provided with a catalytically active coating to support the oxidizing reaction.

Figure 5:
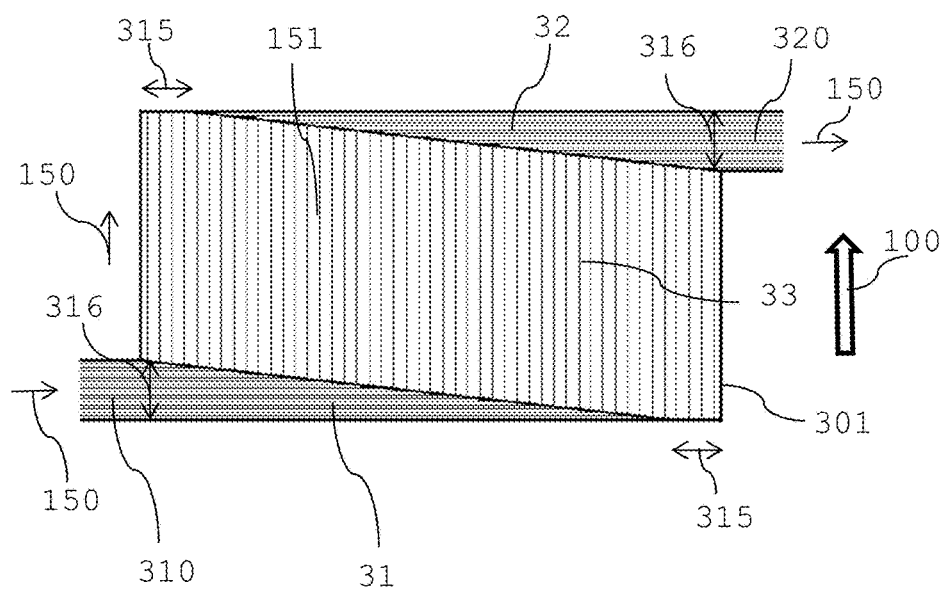
FIG. 5 is a flow simulation for a second fluid flow in a reformer or a heat exchanger.

In FIG. 5 a fluid flow in a reformer is shown in an abstracted form by means of flow lines 151. The density of the flow lines indicates flow velocity. The general second flow direction is indicated by arrows 150, wherein the main flow direction is again indicated by arrow 100.

The principle arrangement and design of the reformer zones 31,32,33 are similar to the ones of the heat exchanger in order to create a central zone 33 with a uniform flow distribution and flow direction which is essentially parallel to the main flow direction 100. Therefore, in the central zone 33 a high pressure drop for a uniform flow and a low flow velocity is provided. The latter supporting an efficient reforming action and especially also in the case of the heat exchanger an efficient heat exchanging process. In the wedge-shaped internal distribution and collection zones 31 and 32 preferably a pressure drop is low and may vary over the width of the plate 301. The inlet distribution zone 31 and the outlet collection zone 32 do not extend along the entire width of the plate 301. The zones 31,32 end at a distance 315 before the end of the width of plate 301. Distance 315 is chosen and may be varied depending on the application of the component. Basically, by enlarging the distance 315 a fluid flow may be slowed down before reaching the bottom right corner and the top left corner of the plate 310 with respect to the embodiment drawn in FIG. 5. Thus, an accumulation of fluid in these corners may be prevented and a homogenous distribution of the flow over the central zone 33 may further be supported. Also the width 316 of the distribution and collection zones 31,32 may vary and be larger or smaller depending on the application of the component.

The width is larger than the extension of the plate 301 in longitudinal direction (main flow direction 100). By this, a rather large central zone 33 with optimized flow characteristic is created.

Pressure drop may be influenced by surface structures or profiles of the plates of the reformer stack or of the heat exchanger stack, accordingly. Therefore, preferably a central zone 33 is provided with surface structures, while distribution and collection zones 31,32 comprise no or only little surface structures. Surface structures may for example be combined with a catalytic coating applied in the central zone 33.

Figure 6:
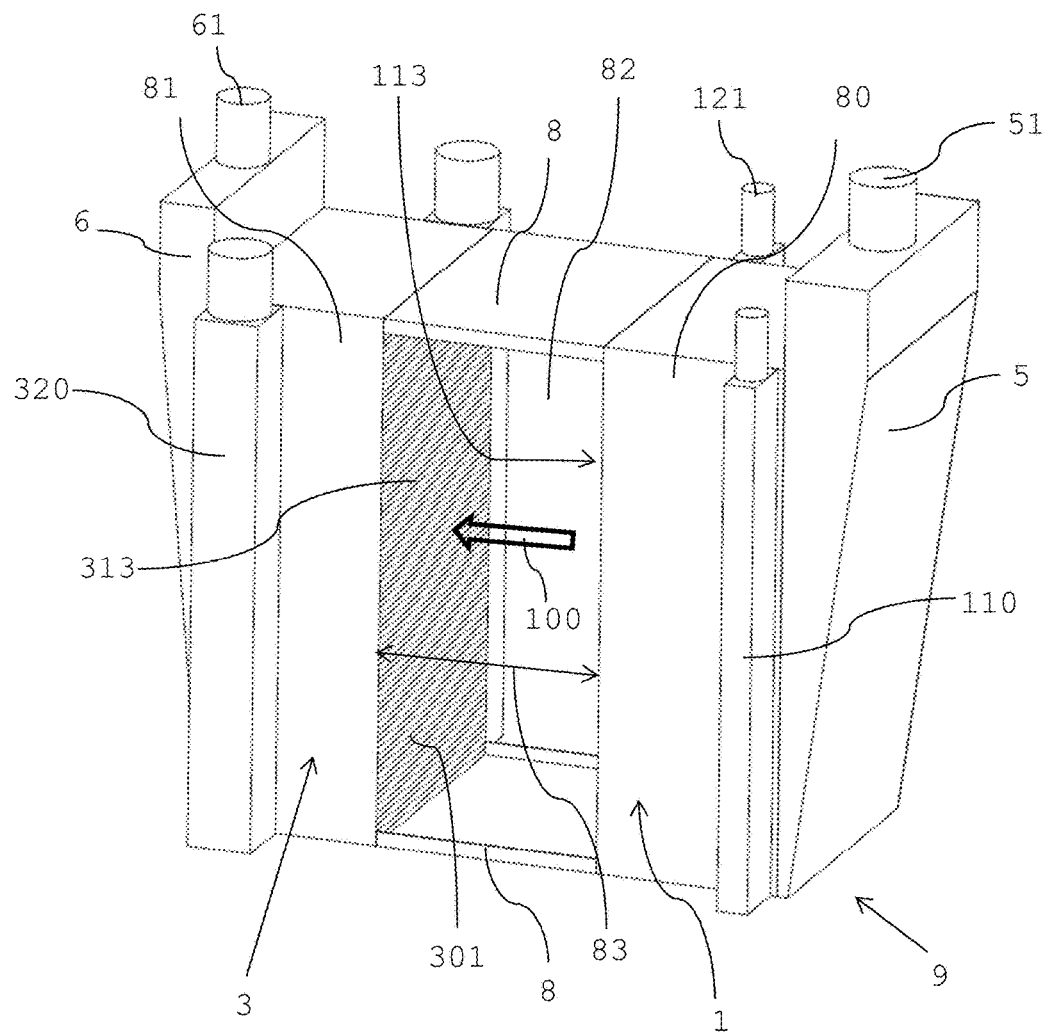
FIG. 6 shows a component unit with two assembled stack components.

In FIG. 6 a component unit 9 is shown, wherein same reference numerals are used for the same or similar elements. A first component, for example a heat exchanger stack 1 is arranged opposite to and distanced at a distance 83 from a second component, for example a reformer stack 3. A stack wall 113,313 at (or by) each of the components is formed by the sum of plate side walls or the first fluid outlets of the heat exchanger 1, respectively as well as by the sum of plate side walls or the first fluid inlets of the reformer 3, respectively. These two walls 113,313 are arranged parallel to each other allowing a main flow 100 of a first fluid to flow in a linear direction between the plates of and from the heat exchanger to and between the plates of the reformer. No connection means are present and a device, such as for example a fuel cell unit, may be inserted into the space provided between the two components 1,3 making use of this compact and efficient arrangement of two components.

The so arranged stack components 1,3 are combined via a stabilizing frame 8 to form the component unit 9. Via the stabilizing frame 8 the position between the two components may be fixed and the unit 9 stabilized. This stabilization may be required to guarantee that the components 1,3 maintain the right distance, and the same height and lateral position during operation also at different temperatures. The frame prevents that one of the components shifts or rotates relative to the other component, for example caused by thermal expansion or creep, as this can deflect or obstruct the flow as it passes through the apparatus substantially parallel to the longitudinal axis of the apparatus in the main flow direction 100. The stabilizing frame 8 may have a frame compartment for each of the components. A frame compartment 80 may be provided for the heat exchanger 1 and another frame compartment 81 may be provided for the reformer 3, further stabilizing these components against deformations by creep or differential thermal expansion during operation. The middle compartment 82 is a space or cavity provided for a device the components shall be combined with to form for example an apparatus as described herein.

The invention has been described with reference to the embodiments shown in the drawings. However, it is obvious to a person skilled in the art that many variations, modifications or changes are possible without departing from the scope of the invention. By way of example only, the arrangement of inlets and outlets or forms of main inlet and main outlet may vary. For example, the second inlets and second outlets may be arranged differently, also for example at different sides of the arrangement. Also, the manner how the conduits and obstruction means in the conduits or the main inlet and main outlet, as well as the second distribution inlets and second collection outlets are embodied may be different from these elements actually shown in the drawings. All such variations, modifications or changes are intended to be within the scope of the invention which is defined by the appended claims.

The invention claimed is:

1. A component unit for use with a device requiring a fluid flow passing therethrough, the component unit comprising a first stack component and comprising a second stack component, wherein each of the first stack component and the second stack component comprise a plurality of plates arranged parallel to a main flow direction and at a distance to each other forming a first stack of the first stack component and a second stack of the second stack component, wherein each of the first and second stack is open at a front side and at a back side for a first fluid to enter each of the first and second stack at the front side, to pass through each of the first and second stack along the main flow direction in first fluid conduits and to leave each of the first and second stack at the back side; each of the first and the second stack further comprising:
   second fluid conduits with a second fluid inlet and a second fluid outlet, the second fluid inlet is arranged at a lateral side of the stack and the second fluid outlet is arranged at an opposite lateral side of the stack, wherein
   the first stack component and the second stack component are arranged at a predefined distance to each other forming a space in between the first stack component and the second stack component and wherein the open back side of the first stack component is arranged parallel to the open front side of the second stack component wherein the back side of the first stack is facing the front side of the second stack, and wherein a main inlet with an inlet distribution portion is arranged adjacent the first stack component for distributing a main fluid inside the inlet distribution portion over an entire height and width of the first stack component, wherein a depth of the inlet distribution portion varies along the height of the first stack component with an end region of the inlet distribution portion being wider versus a main inlet opening than an end region of the inlet distribution portion opposite the main inlet opening.

2. The component unit according to claim 1, further comprising a stabilizing frame for maintaining the first stack component and the second stack component at the predefined distance and position relative to each other.

3. The component unit according to claim 2, wherein the stabilizing frame comprises at least a frame compartment for the first stack component and for the second stack component.

4. A stack component for use with a device requiring a fluid flow passing therethrough, comprising:
   a plurality of plates arranged parallel to a main flow direction and at a distance to each other forming a stack, wherein
   the stack is open at a front side and at a back side for a first fluid to enter the stack at the front side, to pass through the stack along the main flow direction in first fluid conduits and to leave the stack at the back side; further comprising:

second fluid conduits with a second fluid inlet and a second fluid outlet, the second fluid inlet is arranged at a lateral side of the stack and the second fluid outlet is arranged at an opposite lateral side of the stack;

wherein the second fluid conduits are formed from plates of the plurality of plates and at least one of the plates forming the second fluid conduits comprises a central zone arranged next to an inlet distribution zone and next to an outlet collection zone, wherein different obstructions in the form of structures provided in conduit walls, are arranged in the central zone and in at least the inlet distribution zone or the outlet collection zone of the second conduits such that a pressure drop in the second fluid caused by the obstruction in the central zone is higher than a pressure drop caused by the obstruction in the inlet distribution zone and in the outlet collection zone, and such that a second fluid is caused to flow parallel to the main flow direction in the central zone.

5. The stack component according to claim 4, wherein at least one of the inlet distribution zone and the outlet collection zone comprises a variable extension along the main flow direction.

6. The stack component according to claim 4, the plurality of plates forming the stack further comprising sections with chemically active surfaces adapted for use in a fuel cell, wherein a first part of the stack component comprises the second fluid conduits and is adapted to form a heat exchanger stack or a reformer stack, and wherein a second part of the stack component comprises the sections such that the second part of the stack component is adapted for use as a fuel cell unit.

7. The stack component according to claim 4, wherein at least one of the inlet distribution zone and the outlet collection zone has a wedge-shape.

8. The stack component according to claim 7, wherein the inlet distribution zone and the outlet distribution zone has a wedge-shape.

9. The stack component according to claim 4, wherein the central zone has the shape of a parallelepiped.

10. The stack component according to claim 4, wherein the obstructions are in the form of a set of ridges and valleys.

11. The stack component according to claim 4, wherein obstructions are provided in the inlet distribution zone, and wherein the obstructions are more expressed in parts of the inlet distribution zone remote from the second fluid inlet than in parts of the inlet distribution zone next to the second fluid inlet.

12. The stack component according to claim 4, wherein obstructions are provided in the outlet collection zone, and wherein the obstructions are more expressed in parts of the outlet collection zone remote from the second fluid outlet than in parts of the outlet collection zone next to the second fluid outlet.

13. The stack component according to claim 11, wherein the more expressed obstructions are more dense or higher obstructions.

14. The stack component according to claim 12, wherein the more expressed obstructions are more dense or higher obstructions.

15. The stack component according to claim 4, wherein the second fluid inlet and the second fluid outlet are arranged at opposite lateral sides of the stack such that the second fluid flow in the inlet distribution portion flows perpendicular to the main flow direction, is redirected to then flow parallel to the main flow direction in the central zone, and is then redirected to flow perpendicular to the main flow direction in the outlet collection zone.

16. The stack component according to claim 4, wherein the structures in the central zone are more expressed than the structures in the inlet distribution zone or in the outlet collection zone.

17. The stack component according to claim 16, wherein the more expressed structures are more dense or higher structures.

18. A stack component for use with a device requiring a fluid flow passing therethrough, comprising:

a plurality of plates arranged parallel to a main flow direction and at a distance to each other forming a stack, wherein the stack is open at a front side and at a back side for a first fluid to enter the stack at the front side, to pass through the stack along the main flow direction in first fluid conduits and to leave the stack at the back side; further comprising:

second fluid conduits with a second fluid inlet and a second fluid outlet, the second fluid inlet is arranged at a lateral side of the stack and the second fluid outlet is arranged at an opposite lateral side of the stack;

wherein the second fluid conduits are formed from plates of the plurality of plates and at least one of the plates forming the second fluid conduits comprises a central zone arranged next to an inlet distribution zone and next to an outlet collection zone, wherein the central zone comprises obstructions arranged such that a pressure drop in the central zone is higher than in the inlet distribution zone and in the outlet collection zone, and such that a second fluid is caused to flow parallel to the main flow direction in the central zone, wherein obstructions are provided in the inlet distribution zone or in the outlet distribution zone, and wherein the obstructions are more expressed in parts of the inlet distribution zone remote from the second fluid inlet than in parts of the inlet distribution zone next to the second fluid inlet or wherein the obstructions are more expressed in parts of the outlet collection zone remote from the second fluid outlet than in parts of the outlet collection zone next to the second fluid outlet; and wherein the more expressed obstructions are more dense or higher obstructions.

* * * * *